United States Patent [19]
Johnston

[11] Patent Number: 4,779,938
[45] Date of Patent: Oct. 25, 1988

[54] DISPLAY CONSOLE

[76] Inventor: Jimmie L. Johnston, P.O. Box 280667, San Francisco, Calif. 94128

[21] Appl. No.: 111,777

[22] Filed: Oct. 23, 1987

[51] Int. Cl.$^4$ .......................... A47B 49/00; A47F 3/08
[52] U.S. Cl. ...................................... 312/134; 312/97; 312/268
[58] Field of Search ............... 312/268, 266, 134, 125, 312/135, 97, 97.1, 202, 305, 252; 211/13, 131

[56] References Cited

U.S. PATENT DOCUMENTS

| | | | |
|---|---|---|---|
| 686,828 | 11/1901 | Myers | 312/268 |
| 764,280 | 7/1904 | Duerr et al. | 312/134 |
| 2,930,567 | 3/1960 | Lloyd-Young | 211/13 |
| 2,949,683 | 8/1960 | Glover | 211/13 |
| 3,710,477 | 1/1973 | Frawley | 312/97.1 |
| 3,895,718 | 7/1975 | Seiller | 211/13 |
| 4,084,868 | 4/1978 | Lummus | 312/134 |
| 4,204,602 | 5/1980 | Dunchock | 211/13 |
| 4,296,984 | 10/1981 | Lehman | 312/134 |
| 4,312,550 | 1/1982 | Jackson | 312/134 |
| 4,650,264 | 3/1987 | Dahnert | 312/97 |

Primary Examiner—Victor N. Sakran
Attorney, Agent, or Firm—B. Deon Criddle

[57] ABSTRACT

A display console having endless carriers with swing mounted trays thereon. The endless carrier chains are passed over head and tail sprockets within a cabinet in serpentine fashion and the trays are held parallel and upright as they move up and down, over and beneath the sprockets. The trays are particularly adapted to the support of eyeglass frames to be displayed.

7 Claims, 2 Drawing Sheets

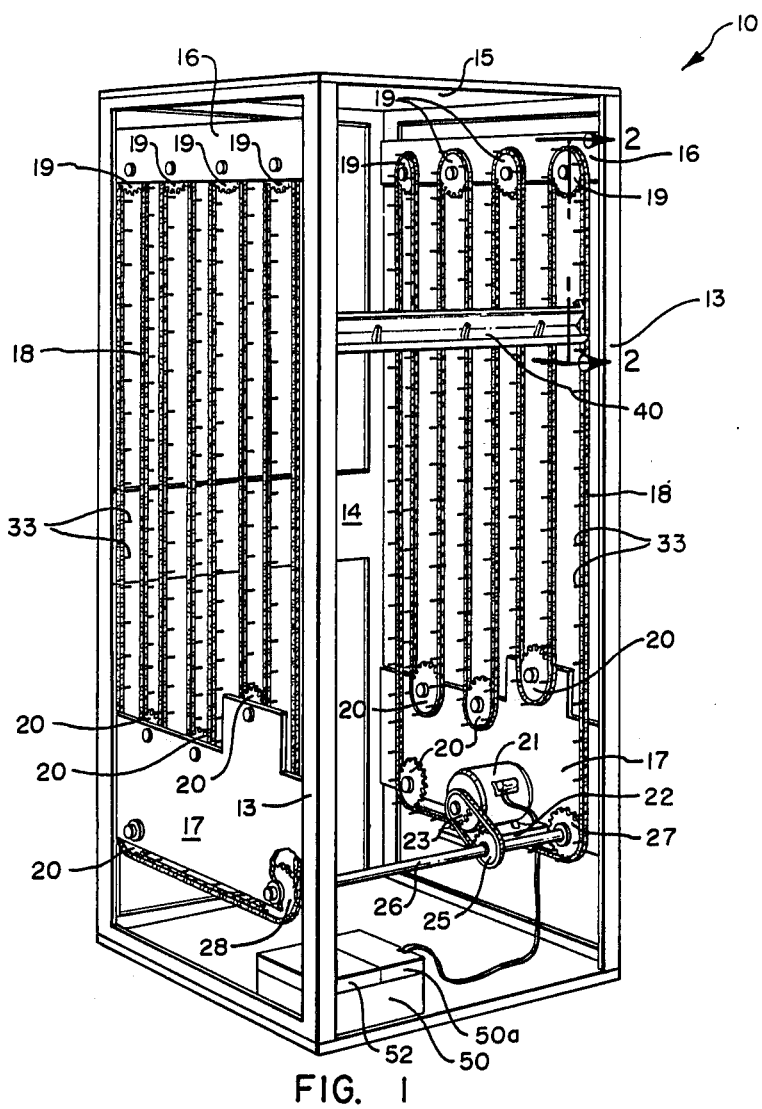
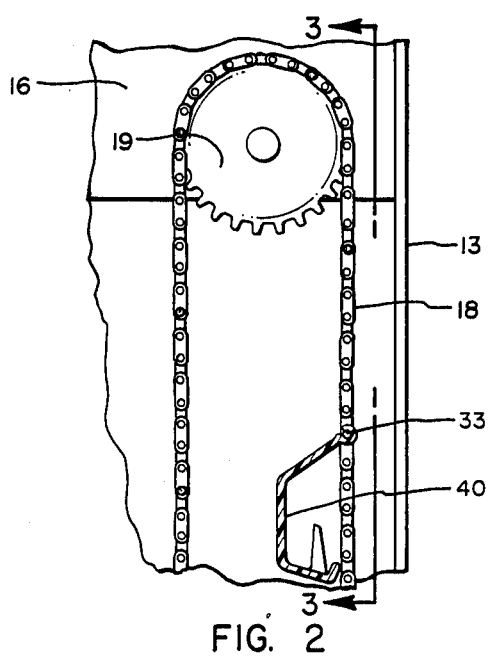
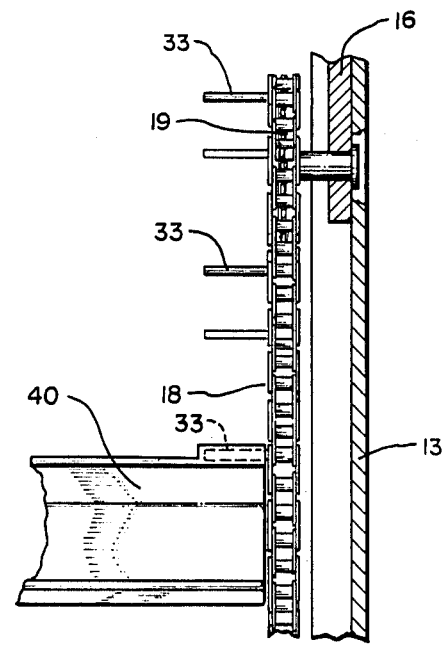
FIG. 1
FIG. 2
FIG. 3

DISPLAY CONSOLE

BRIEF DESCRIPTION OF THE INVENTION

Field of the Invention

This invention relates to moving display consoles and particularly to such consoles having racks used for the display of eyewear and the like.

Background of the Invention

Existing display racks for eyewear and the like are, for the most part, of a fixed shelf type. If made moveable, the shelves commonly rotate about a vertical axis to present columns of fixed shelves to the viewer. With these structures only a very limited number of items may be displayed in an area and, if more items are to be displayed, additional shelves or rotating shelf racks must be provided. The additional shelves or racks take up additional space within the confines of the area in which they are used.

A number of display devices have been proposed in the past that utilize vertically traveling display shelves for the display of various tiems. U.S. Pat. No. 536,575, for example, discloses a shelf for books wherein a plurality of shelves are swing mounted between a pair of wire ropes that are passed over pulleys and that are manually moved. A locking device is provided to prevent undersired travel of the wire ropes.

U.S. Pat. No. 764,280, discloses a display cabinet in which a pair of endless carriers, i.e., belts or chains, are passed around pulleys and have display trays swing-mounted between the carriers. A portion of a front panel is movable to permit access to contents of the trays and it is noted that bolts of ribbon, cloth, jewelry or other articles may be displayed. The carriers are operated manually or by a motor.

U.S. Pat. No. 1,263,124, discloses an advertising device wherein an endless apron or belt of material is passed around spaced apart pulleys and items to be displayed are fastened to and travel with the surface of the apron or belt.

U.S. Pat. No. 4,084,868, discloses a moving display rack where trays are suspended from bars affixed between a pair of spaced apart endless carrier chains. Each of the trays has a box-like configuration, with an open front that will face a window. A spring biased retainer device is provided to hold objects on each tray and a guide device is provided to maintain each tray upright as it is traveled with the carrier chains that are passed over and under a plurality of head and tail sprockets spaced in a housing.

Objects of the Invention

Principal objects of the present invention are to provide a display console having endless carriers and swing mounted trays that will provide bottom and back support for objects to be properly viewed in a horizontal plane and that will provide display of a maximum number of items in a minimum amount of space.

Still other objects are to provide a display console that will permit the rapid location and presentation of a selected display item at a viewing area.

Other objects are to provide a display console particularly for eyewear and incorporating a means to releasably hold the objects in the tray.

Features of the Invention

Principal features of the invention include a console with a pair of endless chains at opposite sides of the housing. The chains are passed over head sprockets and beneath tail sprockets in serpentine fashion and are maintained parallel to one another. Pins carried by the parallel chains provide support means for trays extending between the chains.

The trays are mounted to swing and for display at a front window by snapping them onto the pines projecting from the endless chains. Each tray is balanced so that it will maintain proper alignment and is angled to provide proper clearance between trays as the chains on which they are carried pass over and under the head and tail sprockets, respectively. Posts serving as article retainers may be positioned in each tray to prevent lateral movement of displayed objects and to prevent such objects from falling from the trays.

Additional objects and features of the invention will become apparent to those skilled in the art from the following detailed description and drawings.

THE DRAWINGS

In the drawings:

FIG. 1 is a perspective view of a console of the invention and with the exterior paneling and many of the trays removed for clarity;

FIG. 2, an enlarged vertical section, taken on the line 2—2 of FIG. 1;

FIG. 3, a transverse section, taken on the line 3—3 of FIG. 2;

FIG. 4, an exploded, fragmentary view of a typical tray and shwoing the tray coupled to the endless chains; and FIG. 5, a perspective view, partially broken away, of the cabinet of the invention with the exterior paneling in place.

DETAILED DESCRIPTION

Figure 4:
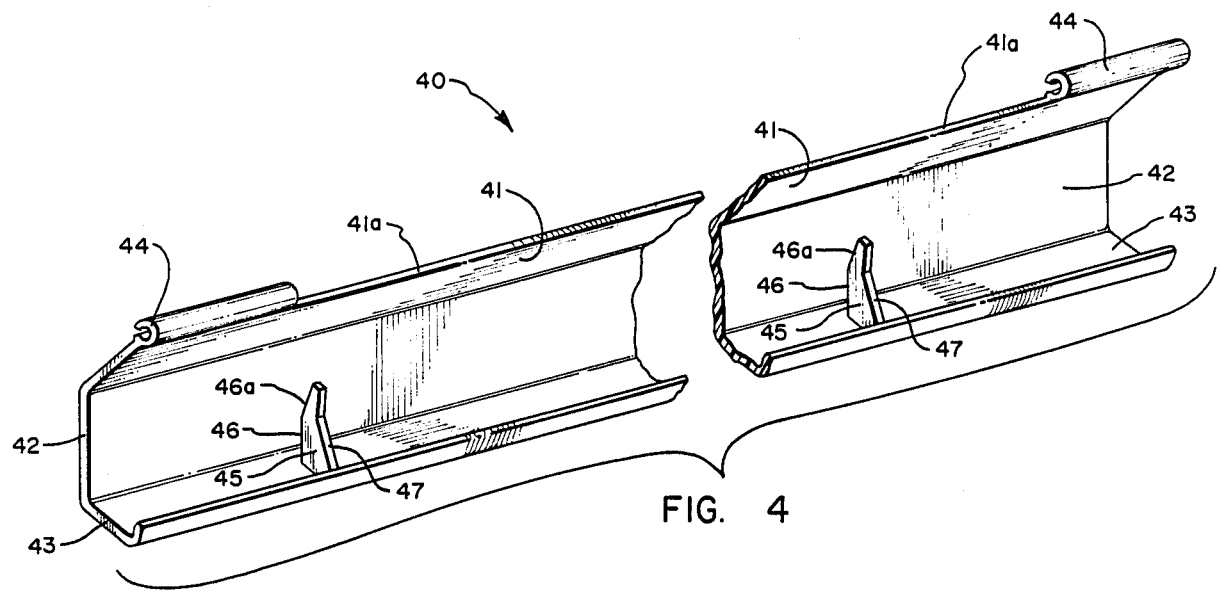
Figure 5:
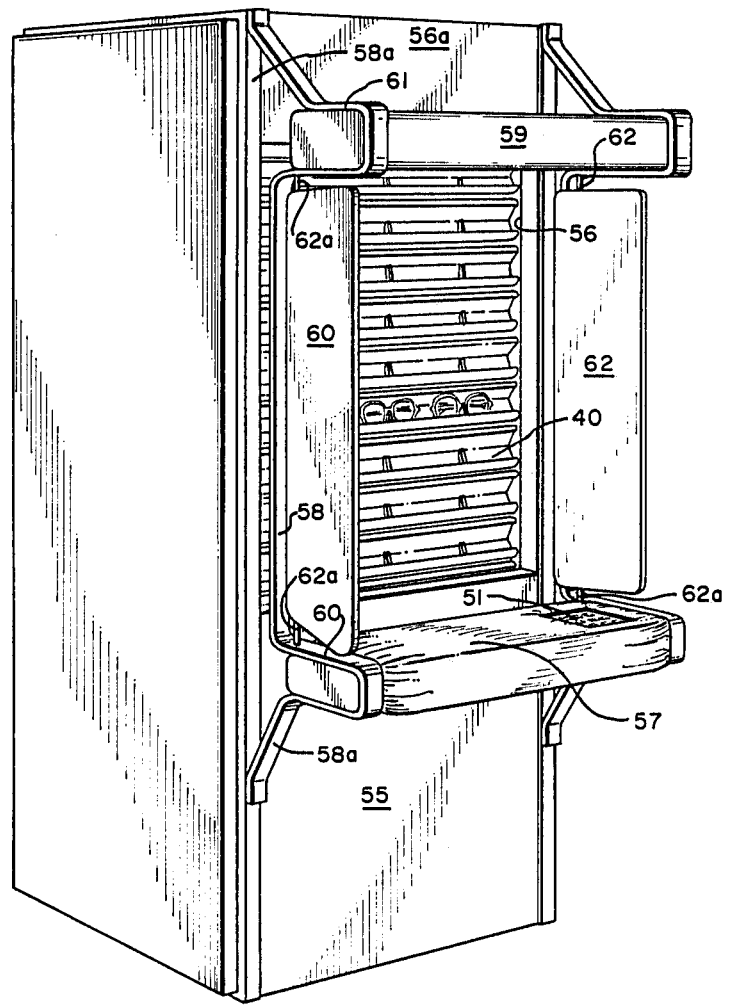

Referring now to the drawings:

In the illustrated preferred embodiment, the display console 10 of the invention includes support frame 13, a back brace 14, a top brace 15, and side braces 16 and 17, and with the braces all attached to the frame, as by welding.

As best seen in FIGS. 1 and 3, each chain 18 of a pair of spaced apart chains is entrained around a plurality of head pulleys 19 and tail pulleys 20. The head pulleys are mounted across the top of the housing at opposite sides thereof and the tail pulleys are mounted across the bottom of the housing at opposite sides thereof, but are alternately spaced closer to and further from the head pulleys. A motor 21 is mounted on a motor support bracket 22 and drives the chains. The chains are driven in unison by motor 21, a sprocket 23 on the output shaft of the motor and a sprocket 25 on a shaft 26 that interconnects the axis of a tail pulley 27 at one side of the housing with a tail pulley 28 at the opposite side of the housing.

Pins 33 are equally spaced along and project from the inner sides of chains 18, with opposing pins being aligned to support a tray 40, only one of which is shown in FIGS. 1-4, but with a full array of trays 40 shown in FIG. 3.

Each tray 40 is formed as a single piece, with an upper wall 41, an intermediate wall 42 and a lower wall 43. The angles formed between the walls are such that the tray will hang from opposed pins 33 with the intermediate wall then extending slightly upwardly and forwardly from the upper wall and the lower wall extending slightly forwardly and downwardly from the intermediate wall. Hooks 44 at opposite ends of an upper edge 41a of the upper wall 41 hook over the pins 33 to swingably suspend the trays from the chains 18.

Article retainers 45 are spaced along and project from the lower wall upwardly towards the upper wall. The retainers 45 are somewhat wedge-shaped, with a rear edge 46 that extends upwardly from the lower wall and normal thereto and that then, at its upper end, angles slightly away from the rear wall as a finger 46a and an inclined front edge 47. When used to retain eyeglasses, the eyeglasses are positioned on the tray with the temples folded and between the rear edge and the rear wall. The lenses of the eyeglasses are then at opposite sides of the retainer 45 and the nosepieces of the eyeglasses will be adjacent the opposite sides of the retainer. The configuration of the rear edge allows for easy insertion of and removal of the eyeglass onto the tray and the shape of the front edge of the retainer allows eyeglasses with different nosepiece configuration to be secured on the tray.

An upturned lip 49 on the edge of lower wall 43 also aids in holding articles on the tray 40. In the case of eyeglasses, the edge of the eyeglass lenses or frames surrounding the lenses, or edges of the lenses themselves, will engage the lip 49 to be held on the tray.

Motor 21 is a reversible electric motor, with power provided from a suitable power outlet. A controller 50 controls operation of the motor. The controller 50 may be a simple reversing switch having a non-connecting, centered position, a forward position at one side of center and a reverse position at the other side of the center. Operation of controller 50 will then operate the motor in either a forward or reverse direction to position a selected tray 40 for observation. Alternatively, the controller 50 may include a computer 50a that receives an input signal from a touch pad 51 and that then operates through a motion control unit 52 (such as a Model P420 manufactured by North Coast Automation, Inc. of Cleveland, Ohio to actuate the controller switch in a forward or reverse direction and that will discontinue operation of the switch when the selected tray (as programmed intothe computer) is positioned for viewing.

A bottom front panel 55 covers a lower portion of the front of the frame 13 and a top front panel 55a covers an upper portion of the front of the frame. A window 56 is thus formed between the bottom front panel and top front panel. The window 56 provides means for viewing and access to each tray 40, or a plurality of trays 40, and their contents, as trays are moved into alignment with the window.

A desk top 57 projects from the bottom front panel and is supported at each side by a side brace 58 that has a lower leg 58a welded to frame 13, an upper leg 58b welded to the frame and a pair of loops 60 and 61 that receive the ends of the desk top 57 and a canopy 59, respectively. Both the desk top and the canopy may, if desired, include lights directed towards the window 56. Preferably, also, mirrors 62 are positioned between the loops 60 and 61 and these can be mounted to pivot on axis 62a or they can be angled and fixed so that a person positioned between them and looking into window 56 can see a reflection. Thus, when the cabinet 10 is used for display of eyeglasses, a person seated in front of the cabinet can operate controller 50, as by pushing the proper buttons on key pad 51 on the desk top 57. Using the controller a selected tray, or selected trays, can be positioned in alignment with the window 56 and the eyeglasses desired can be removed from the tray, tried on and returned to the tray. As many of the other displayed eyeglasses can then be tried, as desired. The mirrors 62 assist the user in evaluating the eyeglasses selected.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A display console comprising a support frame having
    rectangular top and bottom frames, upstanding front and rear corner posts extending from each corner of the bottom frame to a corresponding corner of the top frame and with a viewing area between front posts and top and bottom spacer plates interconnecting the tops and bottoms of adjacent front and rear corner posts at opposite sides of the frame;
    a plurality of top, spaced apart, sprockets each rotatably mounted on an axis and with the axis projecting from each top spacer plate;
    a plurality of bottom spaced apart sprockets rotatably mounted on an axis and with the axis projecting from each bottom spacer plate;
    a pair of spaced apart endless chains at opposite sides of the frame and each entrained on each of the top and bottom sprockets at each side of the housing, said chains each having pins fixed thereto and projecting into the housing; and
    display shelves removably mounted to pivotally swing between the chains and to be sequentially moved by the chains past a viewing location on the frame, said display shelves each having a rear upper wall and pair of spaced apart hooks at opposite ends of said wall with each hook engaging a pin on a chain for substantially the length of the pin.

2. A display console as in claim 1, wherein each display shelf has an intermediate wall and a lower wall, and wherein the upper wall extends upwardly and inwardly from the intermediate wall and the lower wall extends downwardly and inwardly from the intermediate wall.

3. A display console as in claim 2, further including article retaining means spaced along and projecting from the lower wall, projecting upwardly from the lower wall towards the upper wall and spaced from the rear wall.

4. A display console as in claim 1, further including drive means to simultaneously drive the chains to move the display shelves carried thereby to and away from the viewing area.

5. A display console as in claim 4, further including control means to operate the drive means to move a selected shelf to the viewing area and to stop chain movement with said selected shelf at said viewing area.

6. A display console as in claims 2, further including cover panels fixed to the frame and covering all but the viewing area.

7. A display console as in claim 6, further including a canopy above the viewing area;
    a counter beneath the viewing area; and wherein said control means is mounted in the counter.

* * * * *